United States Patent [19]
Pernstich

[11] 3,939,038
[45] Feb. 17, 1976

[54] NUCLEAR REACTOR, CORE VESSEL INTERCEPT CONSTRUCTION

[75] Inventor: Konrad Pernstich, Erlangen, Germany

[73] Assignee: Siemens Aktiengesellschaft, Munich, Germany

[22] Filed: July 18, 1973

[21] Appl. No.: 380,471

[30] Foreign Application Priority Data
July 28, 1972 Germany............................ 2237208

[52] U.S. Cl...................................... 176/38; 176/87
[51] Int. Cl................................................. G21c 9/00
[58] Field of Search .................... 176/37, 38, 40, 87

[56] References Cited
UNITED STATES PATENTS

| | | | |
|---|---|---|---|
| 3,140,982 | 7/1964 | Haines et al. ......................... | 176/38 |
| 3,207,670 | 9/1965 | Fortescue et al. ..................... | 176/37 |
| 3,378,452 | 4/1968 | Costes................................ | 176/38 X |
| 3,702,802 | 11/1972 | Jansen, Jr. ........................... | 176/87 |
| 3,719,556 | 3/1973 | Snyder, Jr. et al.................... | 176/87 |

*Primary Examiner*—Robert F. Stahl
*Attorney, Agent, or Firm*—Kenyon & Kenyon Reilly Carr & Chapin

[57] ABSTRACT

A nuclear reactor includes a pressure vessel having a bottom wall above which a core vessel is suspended with its lower end spaced above this bottom wall. In case the core vessel accidentally falls, it is intercepted by a construction transmitting the force of the falling core vessel to the pressure vessel's bottom wall throughout a plurality of widely interspaced positions so that the bottom wall does not have to withstand the force in a localized concentrated manner. Preferably these positions are adjacent to the pressure vessel's side wall, and the intercept construction is made of ductile metal having upper portions reduced in cross-sectional area so that these upper portions are stressed beyond their elastic limit and deform in a ductile shock-absorbing manner if required to intercept the falling core vessel. Various other features of construction are included.

8 Claims, 3 Drawing Figures

NUCLEAR REACTOR, CORE VESSEL INTERCEPT CONSTRUCTION

BACKGROUND OF THE INVENTION

A nuclear reactor includes a pressure vessel having a substantially cylindrical side wall and a substantially hemispherical bottom wall above which a core vessel is suspended with its lower end spaced above this bottom wall. It is possible for the core vessel to accidentally fall, and since it is spaced for a substantial distance above the pressure vessel's bottom wall, it is possible for the latter to be ruptured and release the reactor core coolant.

To prevent this, the prior art has proposed the use of an intercept construction extending upwardly from the pressure vessel's bottom wall towards the core vessel's lower end for intercepting the core vessel if it accidentally falls. The construction is intended to limit, or substantially eliminate, the distance the core vessel can fall. Such a construction must transmit the falling force and ultimately the static weight of the core vessel to the pressure vessel's bottom wall.

Incidentally, in addition to preventing the core vessel from falling forcibly against the pressure vessel's wall in the event of an accident, it is important that the core vessel be intercepted so that it is held at least approximately at its normal position where it is within the coolant flow to assure that the core in the vessel continues to receive adequate cooling.

An example of a prior art core vessel intercept construction is described in the book VGB-Nuclear Power Plant Seminar 1970, p. 33. This construction is in effect a stool, and the force of holding the core vessel in position, in the event of an accident, is concentrated exclusively over a relatively small, localized area of the spherical bottom wall of the pressure vessel, giving rise to high local stressing of this bottom wall.

SUMMARY OF THE INVENTION

One object of the present invention is to provide a core vessel intercept construction which, should its use be required, avoids transmittal of the force of the accidentally released core vessel, exclusively to a localized area of the pressure vessel's bottom wall.

This object is attained by the present invention through the provision of a structural metal framework supported by the pressure vessel's bottom wall at a plurality of interspaced positions, at least some of these positions being adjacent to the peripheral portion of the bottom wall which is where the latter integrally connects with the pressure vessel's side wall with the latter capable of carrying very substantial force and tension. The framework extends upwardly at least adjacent to the core vessel's lower end.

The framework includes an annular series of substantially vertical interspaced columns extending upwardly from the pressure vessel's bottom wall's peripheral portion, and a central substantially vertical column extending upwardly from substantially the center of that bottom wall, struts extending laterally from this central column to the annular series of columns and positioning them on the pressure vessel's bottom wall which, being hemispherical, sharply declines arcuately at its peripheral portion.

Substantially flat ductile metal blades form the peripheral series of columns and are positioned in radial planes with respect to the central column, by the mentioned struts, and these flat plate columns are all connected by a metal ring which is substantially concentric, as are the columns of the peripheral series, with the central column. Means are provided for tensioning the central column downwardly so that via the mentioned struts the annular series of columns have their bottoms pulled downwardly against the hemispherical bottom wall of the pressure vessel.

A downwardly extending peripheral flange is a part of the core vessel and the framework includes a ring connected with the annular series of columns and which is at least partially inside of this flange and peripherally adjacent thereto. This ring is supported by the upper ends of the annular series of columns and the upper portions of the latter are reduced in cross-sectional area in such a manner that if the core vessel falls, these reduced portions are stressed beyond their elastic limits and deform in a ductile manner to provide for a gradual absorption of the falling force, and, of course, ultimately the static weight of the core vessel, when required. The central column is also made of flat plates radially arranged, each with its upper end reduced in cross-sectional area so as to correspondingly deform in a shock-absorbing manner. The plates of the central column are in the radial planes of the plates forming the annular series of columns.

There is at least a slight space between the upper end of this intercept structural framework and the core vessel, to provide room for thermal expansion and contraction of the parts. The core vessel can fall this short distance and thereafter its weight must be supported by the framework. The falling force is absorbed in a shock-absorbing manner by the ductile deformation of the parts, as described above. All of the parts are symmetrically distributed about the central column, and the upper ring of the framework laterally positions the falling core vessel, and therefore, the ductile deformation is uniformly distributed without excessive angular displacement. Thereafter the core vessel is held upwardly approximately reasonably close to its normal position so that its fuel elements continue to receive the cooling of the normal coolant flow.

BRIEF DESCRIPTION OF THE DRAWINGS

A preferred embodiment of the invention is illustrated by the accompanying drawings in which.

DESCRIPTION OF THE PREFERRED EMBODIMENT

Figure 1:
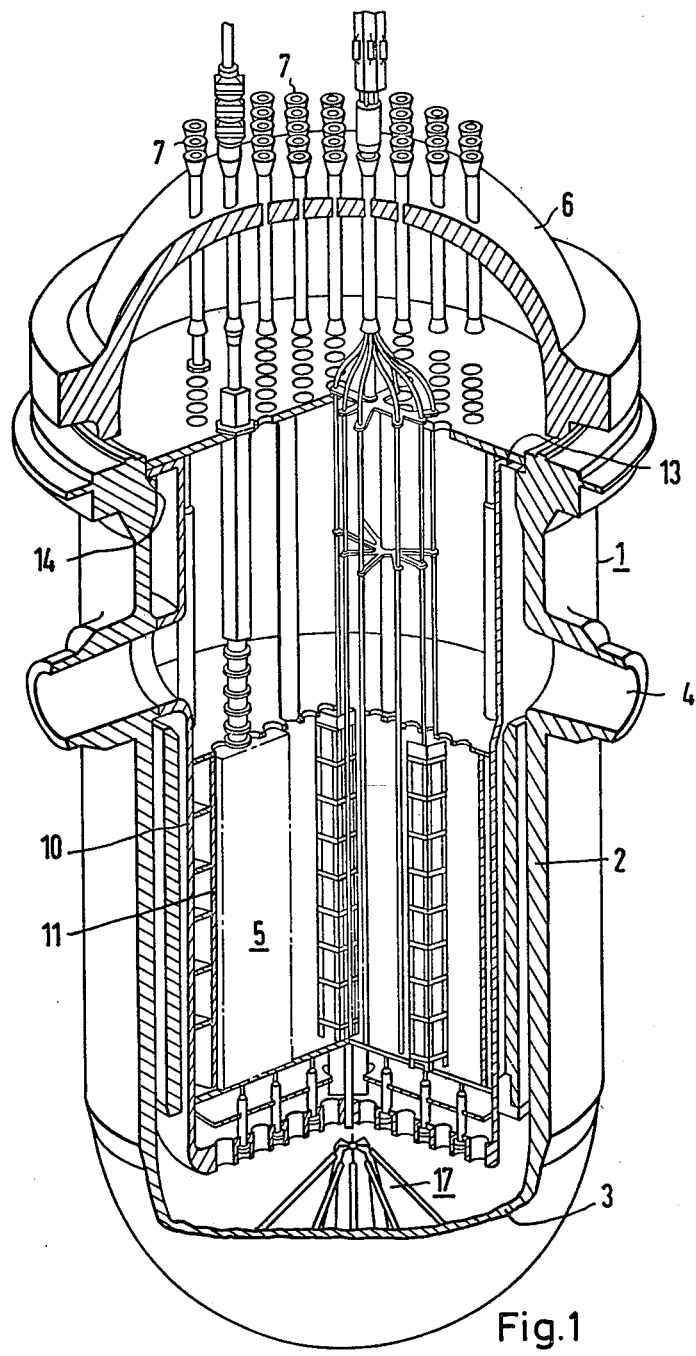
FIG. 1 is a perspective view, partially sectioned, showing a nuclear reactor of the liquid-coolant type and including the core vessel intercept construction of the present invention.

The pressurized-water coolant nuclear reactor 1 shown by FIG. 1, includes a substantially cylindrical side wall 2 and a hemispherical bottom wall 3, the two walls being integral with each other, the side wall having pressurized water coolant connections 4 and a detachable cover 6 normally clamped firmly against the upper end of the side wall 2. The cover 6 carries various tubular connections 7 for the control rod drives.

The core 5 may be conventional and consists of various individual fuel elements enclosed by the core vessel 10. These fuel elements are supported via a core frame 11 which rests on a flange 12 of the core vessel 10 (see FIG. 2), while the core vessel itself is suspended by its upper end via an annular flange 13, shown in FIG. 1, which rests on an internal shoulder 14 provided by the pressure vessel at its upper end.

It can be appreciated that the core vessel, including its associated parts, is of substantial weight. It is the function of the core vessel intercept arrangement 17 to prevent this core vessel from accidentally falling through the entire distance beneath it and above the pressure vessel's bottom wall 3. The construction 17, as shown in FIG. 1, does not include all of the features of the present invention, its illustration in this figure being only to indicate in a general manner the location where the core vessel's intercept device is required.

Figure 2:
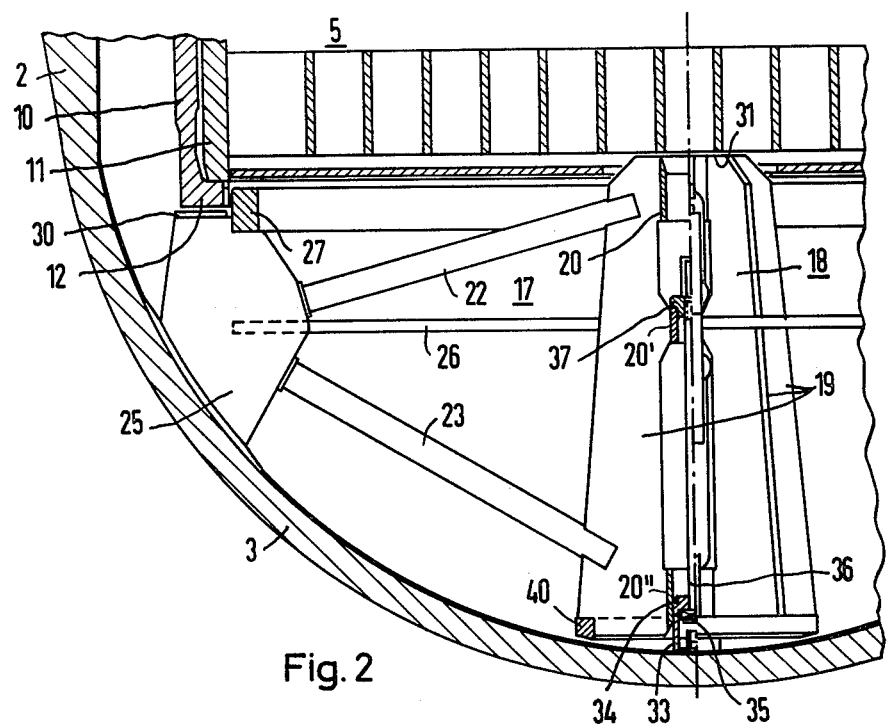
FIG. 2 is a vertical section of the lower end of the reactor and showing the new intercept construction in detail.
Figure 3:
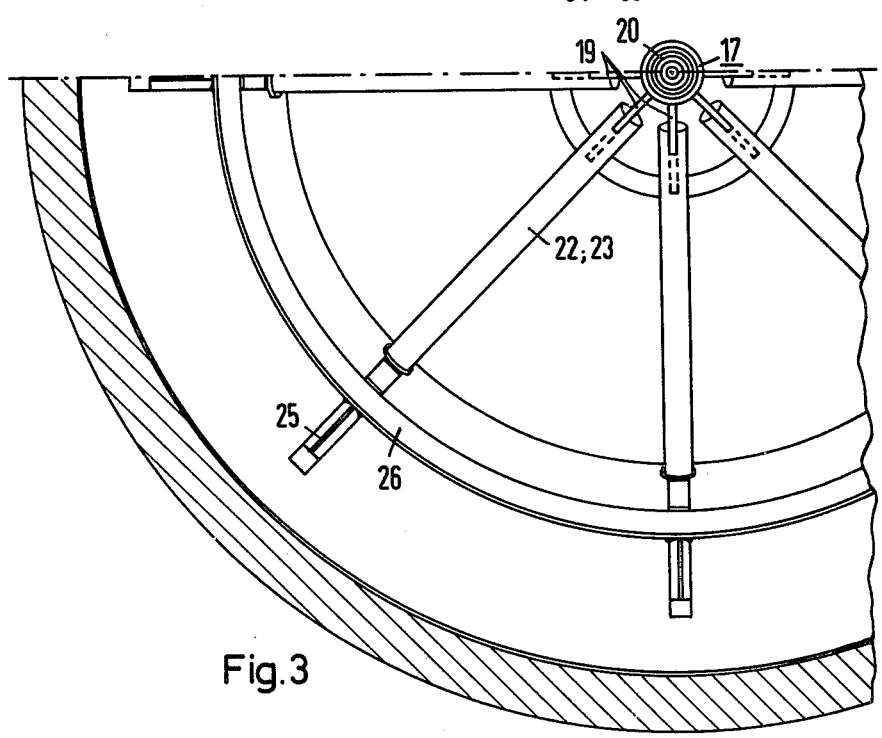
FIG. 3 is a cross section showing the new construction.

Referring now to FIGS. 2 and 3, which do show the details of the present invention, the detailed construction is as follows:

The entire construction is made of metal having adequate ductility to avoid rupture when stressed beyond its elastic limit by the performance of its intended functions. The various parts may be interconnected, where required, by welding.

The central column 18 comprises eight radially arranged, vertically elongated plates 18 inwardly interconnected by three vertically-interspaced short tubes 20, 20' and 20''. Eight tubes in each instance form upper and lower strut systems, these being shown at 22 and 23, respectively, with each set of upper and lower tubes welded to one of the plates 19 at vertically interspaced locations. The annular series of columns are formed by plates 25 which are also radially arranged with respect to the center line of the construction and which are registered in each instance with one of the plates 19, the upper and lower strut members 22 and 23 converging and being welded at relatively closely interspaced upper and lower locations to the plates forming the annular series of vertical columns.

The bottoms of the plates or columns 25 rest on the hemispherical bottom 3 near its periphery and close to its vertical side wall 2. The vertical columns 25 are aligned with the periphery of the core vessel 10 and they are connected with each other by a ring 26 arranged in a horizontal plane between the upper and lower tubular struts 22 and 23 of the strut sets. The tops of the columns or plates 25 carry a centering ring 27 which extends into the flange 12 of the core vessel 10, in interspaced but closely adjacent peripheral relationship with the flange 12.

The plates 19 and 25 and upper portions 30 and 31 are reduced in cross-sectional areas by cutting the plates so they taper upwardly. The reduction in cross-sectional area is designed relative to the elastic limit of the plate metal and the anticipated falling force of the core vessel, so that these upper portions are deformed beyond their elastic limit by the falling core vessel to provide a shock-absorbing effect by the gradual dissipation of the falling energy of the core vessel as the parts plastically deform in a ductile manner.

The spherical bottom 3 has an upwardly extending sleeve 33 welded to it with a cover 34 in which a slot is formed and in which is inserted the head 35 of a long tension bolt 36 which extends upwardly and through the intermediate tube 20' to which the blades 19 are welded, where the tension rod is provided with a screw-threaded engagement with a nut 37 engaging the top of this tube 20' and which pulls downwardly on the central column so that via the struts 22 and 23 the annular series of plates 25 are pulled downwardly against the arcuate sides of the bottom of the hemispherical vessel.

The arrangement is such that between the bottom of the central column construction and the upper surface of the pressure vessel's bottom wall 3 a small space remains such as in the area of 20 mm space. This spacing is between the lower edge 40 of the central column, which comprises an annular ring to which the bottom edges of the plate 19 are welded.

It is also to be noted that there is a slight space between the top level of the intercept framework and the bottom of the core vessel. Such spacing provides for thermal expansion and contraction but, incidentally, provides room for the core vessel to fall and gain momentum or kinetic energy, which is however absorbed gradually by the ductile deformation of the parts. All of the parts are symmetrically distributed about the vertical centerline of the pressure vessel's hemispherical bottom and the pressure vessel itself. Therefore, with all of the parts symmetrical as the framework deforms, there is little tendency for the core vessel to move laterally or angularly in its short descent. Lateral shifting is prevented by the ring 27 which is peripherally interspaced from the core vessel's flange 11 for only a distance required for thermal expansion and contraction movements.

What is claimed is:

1. A pressurized-water nuclear reactor including a pressure vessel having a substantially cylindrical side wall and a substantially hemispherical bottom wall above which a core vessel is positioned by its top, with its lower end spaced above this bottom wall, and means extending upwardly from the latter towards said lower end for intercepting said core vessel if it accidentally falls, said pressure vessel having a cover and pressurized-water coolant connections; wherein the improvement comprises said means being formed by a structural metal framework inside of said vessel and supported by said bottom wall at a plurality of interspaced positions, said framework extending upwardly until at least adjacent to the core vessel's said lower end, at least some of said interspaced locations being adjacent to the peripheral portion of said bottom wall, said framework being made of ductile metal and having upper portions proportioned to deform beyond the elastic limit of the metal and absorb the shock of intercepting said core vessel when it falls.

2. The reactor of claim 1 in which said framework includes an annular series of substantially vertical interspaced columns extending upwardly from said peripheral portion.

3. The reactor of claim 2 in which said framework includes a central substantially vertical column extending upwardly from substantially the center of said bottom, and struts extending laterally from this central column to said annular series of columns and positioning them on said peripheral portions.

4. The reactor of claim 3 in which said peripheral series of columns are formed by substantially flat plates positioned in radial planes with respect to said central column and are interconnected by a ring.

5. The reactor of claim 3 having means connecting with said bottom wall for tensioning said central column downwardly.

6. The reactor of claim 3 in which said core vessel has a downwardly extending flange and said framework includes a ring connected with said annular series of columns and positioned thereby at least partly inside of said flange and peripherally adjacent thereto.

7. The reactor of claim 3 in which all of said columns are plates made of ductile metal and are upwardly tapered to provide gradually reducing cross-sectional areas for shock-absorbing deformation beyond the metal's elastic limit when intercepting said core vessel if it falls.

8. A pressurized-water nuclear reactor including a pressure vessel having a substantially cylindrical side wall and a substantially hemispherical bottom wall above which a core vessel is positioned by its top, with its lower end spaced above this bottom wall, and means extending upwardly from the latter towards said lower end for intercepting said core vessel if it accidentally falls, said pressure vessel having a cover and pressurized-water coolant connections; wherein the improvement comprises said means being formed by a structural metal framework inside of said vessel and supported by said bottom wall at a plurality of interspaced positions, said framework extending upwardly until at least adjacent to the core vessel's said lower end, at least some of said interspaced locations being adjacent to the peripheral portion of said bottom wall, said framework including a plurality of substantially vertical interspaced columns extending upwardly from said locations adjacent to said peripheral portion, a central substantially vertical column extending upwardly from substantially the center of said bottom, and struts extending laterally from this central column to said plurality of columns and positioning them on said peripheral portions.

* * * * *